United States Patent
Mitchell et al.

(10) Patent No.: US 6,834,337 B1
(45) Date of Patent: Dec. 21, 2004

(54) SYSTEM AND METHOD FOR ENABLING MULTIPLE SIGNED INDEPENDENT DATA ELEMENTS PER REGISTER

(75) Inventors: Joan Laverne Mitchell, Longmont, CO (US); Michael Thomas Brady, Longmont, CO (US); Jennifer Q. Trelewicz, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 09/675,779

(22) Filed: Sep. 29, 2000

(51) Int. Cl.$^7$ .................. G06F 9/302; G06F 9/305; G06F 13/40

(52) U.S. Cl. ............. 712/222; 712/223; 712/224; 712/300; 708/490; 710/66; 710/307

(58) Field of Search .................. 712/26, 210, 300, 712/245, 22, 221, 222, 223, 224; 708/552, 707, 705, 706, 672, 490, 503, 236, 629; 358/1.16; 710/307, 66

(56) References Cited

U.S. PATENT DOCUMENTS

| | | | |
|---|---|---|---|
| 3,816,734 A | * 6/1974 | Brendzel .................. 708/705 |
| 4,752,873 A | 6/1988 | Shonai et al. ............. 712/23 |
| 5,179,641 A | * 1/1993 | Comins et al. ............ 345/596 |
| 5,218,564 A | 6/1993 | Covey ...................... 708/603 |
| 5,230,057 A | 7/1993 | Shido et al. .............. 712/22 |
| 5,341,506 A | * 8/1994 | Nohmi et al. ............. 712/26 |
| 5,381,531 A | 1/1995 | Hanawa et al. ........... 712/235 |
| 5,390,135 A | 2/1995 | Lee et al. ................. 708/518 |
| 5,408,670 A | 4/1995 | Davies ..................... 712/16 |
| 5,410,721 A | * 4/1995 | Divine et al. ............. 712/245 |
| 5,418,915 A | 5/1995 | Matuda et al. ............ 712/22 |
| 5,594,679 A | 1/1997 | Iwata ....................... 708/521 |
| 5,602,769 A | * 2/1997 | Yu et al. .................. 708/503 |
| 5,669,010 A | 9/1997 | Duluk, Jr. ................. 712/22 |
| 5,689,450 A | 11/1997 | Kurokawa et al. ........ 708/524 |
| 5,692,207 A | 11/1997 | Ho-Lung et al. .......... 712/36 |
| 5,818,364 A | 10/1998 | Hintzman et al. ......... 341/65 |
| 5,847,978 A | 12/1998 | Ogura et al. .............. 708/552 |
| 5,864,703 A | * 1/1999 | Van Hook et al. ........ 712/22 |
| 5,881,259 A | 3/1999 | Glass et al. ............... 712/210 |
| 5,907,694 A | 5/1999 | Suzuki et al. ............. 712/210 |
| 5,958,038 A | 9/1999 | Agrawal et al. ........... 712/36 |
| 6,038,652 A | 3/2000 | Phillips et al. ............ 712/22 |
| 6,243,803 B1 | * 6/2001 | Abdallah et al. .......... 712/210 |
| 6,519,052 B1 | * 2/2003 | Oneda et al. .............. 358/1.16 |

FOREIGN PATENT DOCUMENTS

JP      3257579 A2      11/1991

OTHER PUBLICATIONS

IBM Technical Disclosure Bulletin. "Multisequencing a Single Instruction Stream as High–End Machine". vol. 36, PubNo. 5. pp. 9–12. May 1993.

IBM Technical Disclosure Bulletin. "High Speed Parallel SIGNATURE Board". pp. 114–119. Jun. 1986.

* cited by examiner

*Primary Examiner*—Daniel H. Pan
(74) *Attorney, Agent, or Firm*—John L. Roitz

(57) ABSTRACT

A system and method for data processing includes packing multiple signed data elements per register into a processor's registers using the rules set forth herein, and simultaneously operating on the elements in a register in a single cycle using the same operand. The elements can be independent of each other, and the sizes of the elements in a register can differ from each other. Moreover, a relatively large element can be split across multiple registers. In an exemplary application, a data stream representing two images can be simultaneously processed using the same number of registers as have been required to process a single image. Or, a single image can be processed approaching N-times faster, where N is the number of elements per register. In any case, the present invention results in a significant increase in processing efficiency.

46 Claims, 7 Drawing Sheets

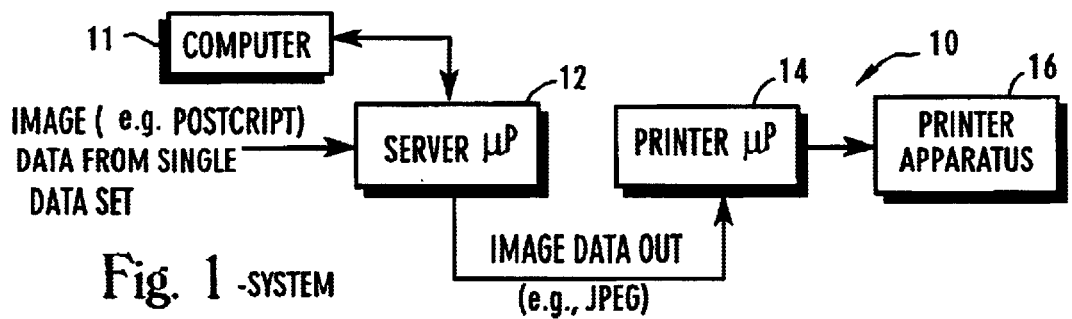
Fig. 1 -SYSTEM
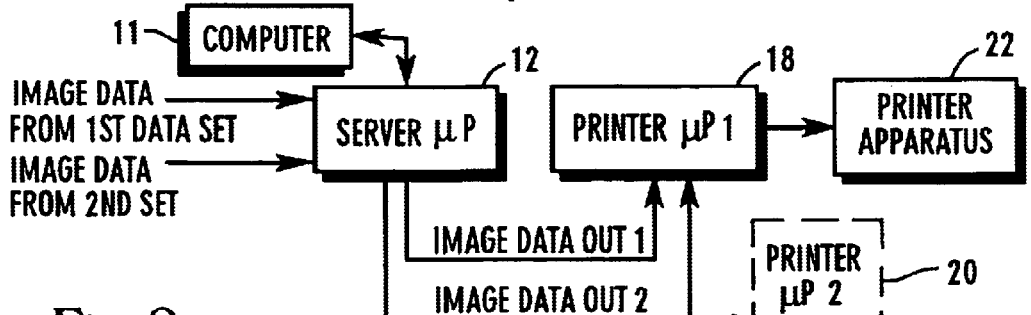
Fig. 2 -SYSTEM
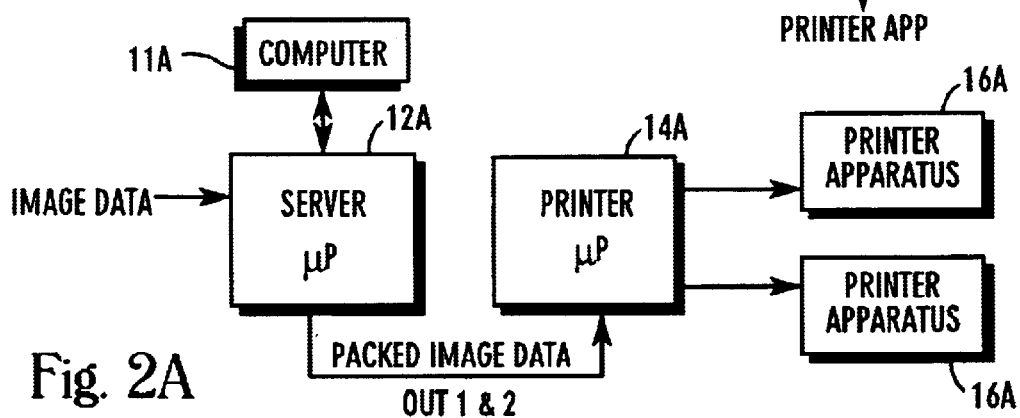
Fig. 2A
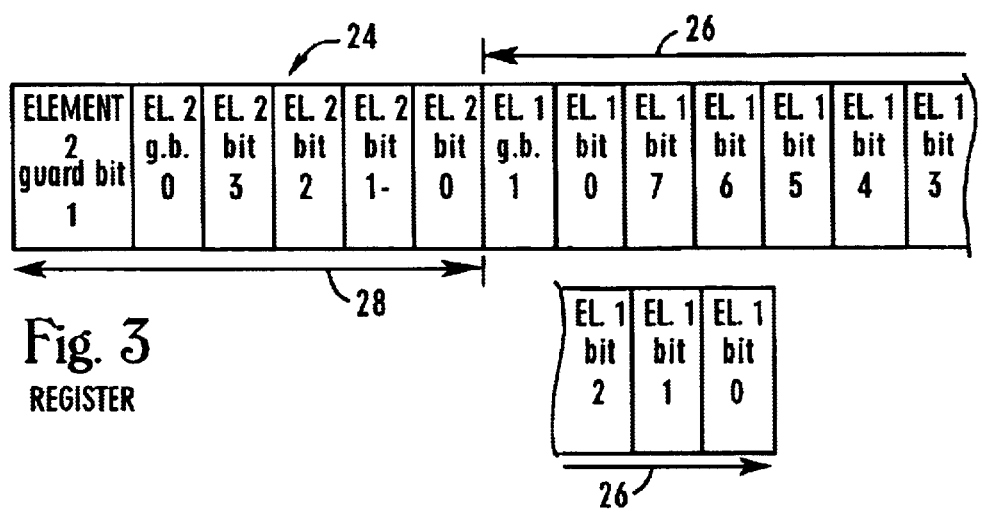
Fig. 3
REGISTER

OVERALL FLOW

REGISTER SET UP

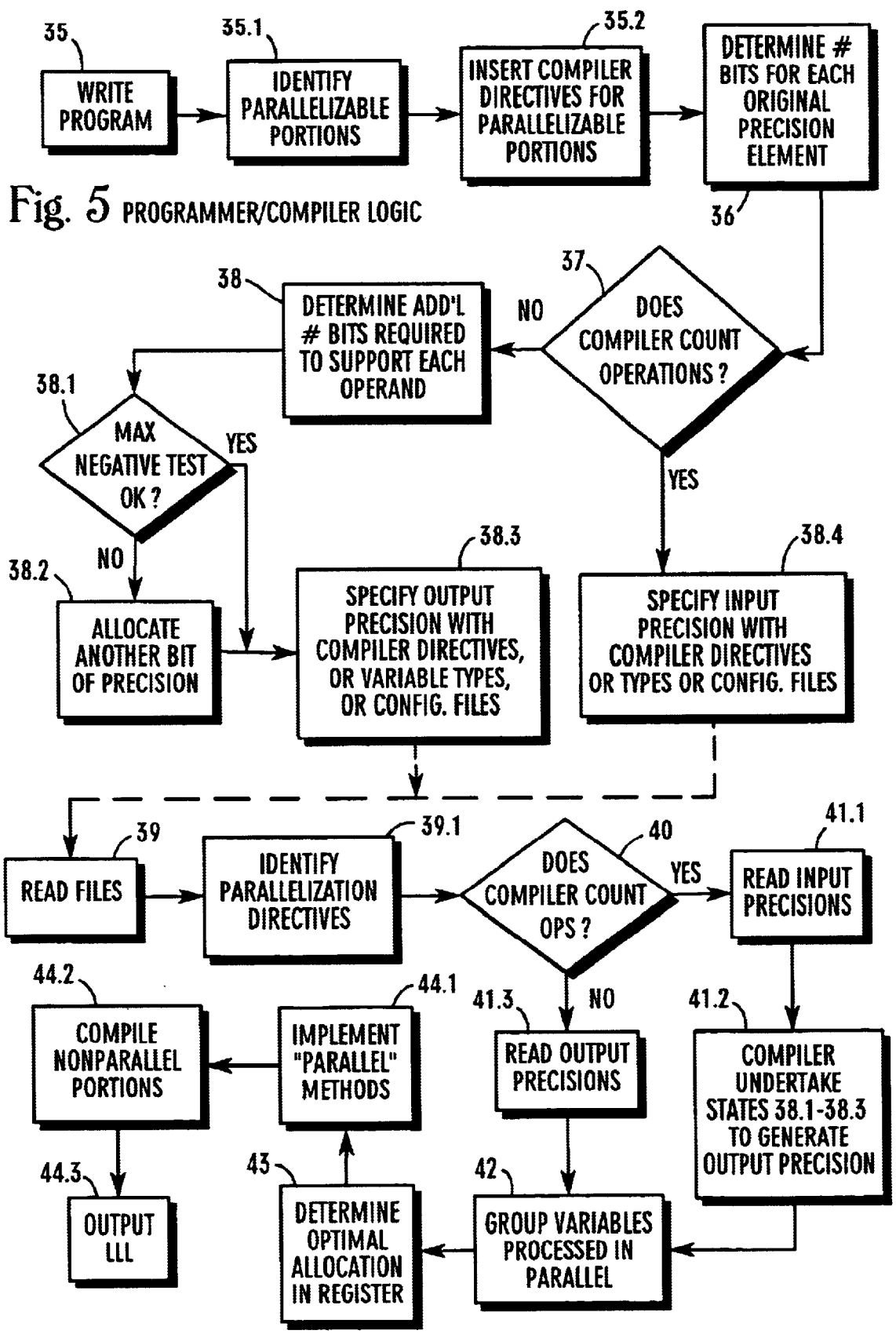
Fig. 5 PROGRAMMER/COMPILER LOGIC

INITIALIZATION

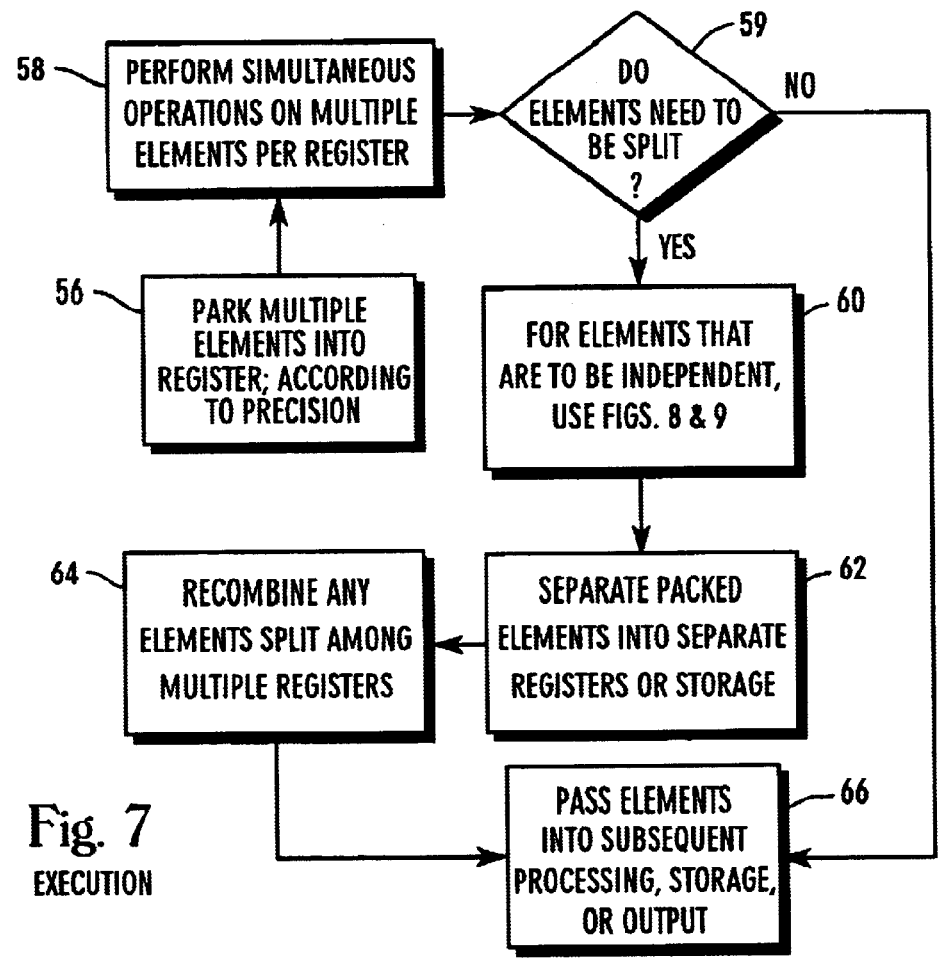
Fig. 7 EXECUTION
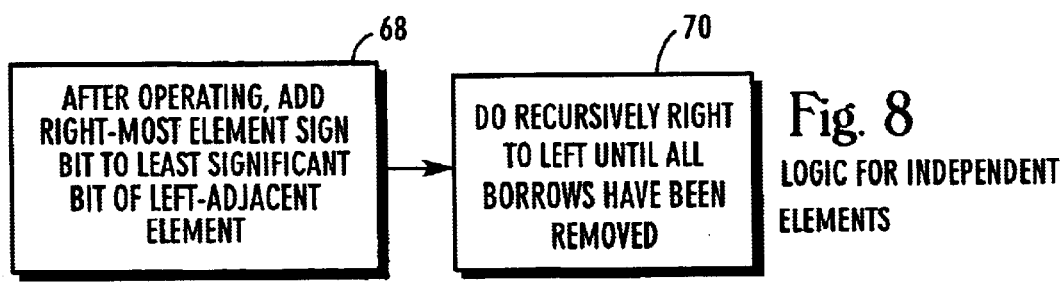
Fig. 8 LOGIC FOR INDEPENDENT ELEMENTS
Fig. 9 ALT. LOGIC FOR INDEPENDENT ELEMENTS

LOGIC FOR DETERMINING WHETHER ELEMENT CONTAINED AROUND ZERO

Fig. 11
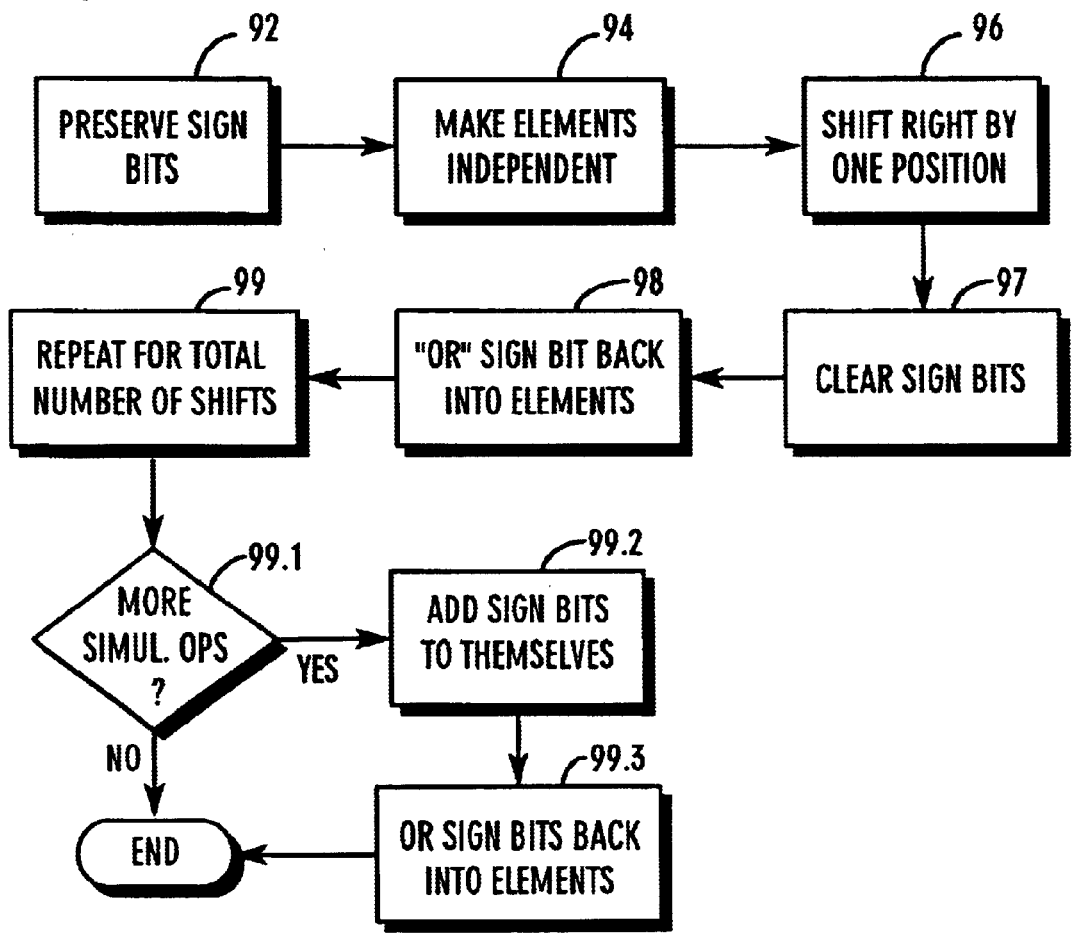
Fig. 12 LOGIC FOR ARITHMETIC COMPARES
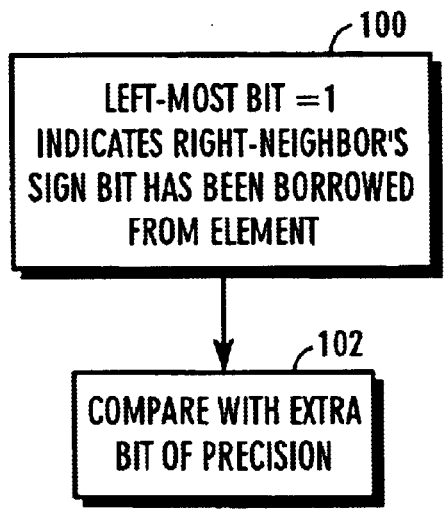

SYSTEM AND METHOD FOR ENABLING MULTIPLE SIGNED INDEPENDENT DATA ELEMENTS PER REGISTER

BACKGROUND OF THE INVENTION

1. Field of the Invention

The present invention relates to systems and methods for processing data in computer registers.

2. Description of the Related Art

Computer processors function by processing data elements through various registers in accordance with instructions provided by a computer program. The registers have a capacity that is a power of two. For instance, a register might have a capacity of 8 bits, and it would be able to process, in a single processing cycle, a data element having up to eight bits in the element. As an example, an 8-bit register can process a 4-bit data element in a single cycle. Of course, registers typically have sizes larger than 8 bits, i.e., registers can have 16 bit capacities, or 32 bits, or 64 bits, and so on. Non-limiting illustrative examples of the types of operations undertaken by registers include multiplication by a constant, addition, subtraction, shift-left-logical, shift-right-logical, AND, and OR operations.

After the data elements have been processed, they can be sent to another register for further processing, or they can be stored or output. To illustrate, in the printer field a server microprocessor processes an input data stream through its various registers in accordance with a computer program, and it might output a data stream of compressed image data in so-called JPEG format to a printer processor, which then operates on the data as appropriate to instruct a printer apparatus how to print the image.

The processor itself executes instructions in the form of machine language, which are the lowlevel instructions relating to what data elements are processed through which registers. Most software, however, is written in higher-level programming code such as C, which has the advantages of being human readable and of embodying relatively complex processing operations using comparatively short, quickly-written commands. A compiler receives the high-level programming code, decides the best way among many choices to map it into assembly language, passes the mapping to an assembler, and the assembler then maps the assembly language into so-called machine language that is readable by a processor. From time to time, a programmer may elect to write parts of the program that are executed more frequently than other parts directly in a lower-level language. While more cumbersome to write, these so-called "hand-crafted" portions of code do not have to be translated by a high level language compiler and, thus, facilitate faster processing at run time.

Regardless of whether the processor receives the machine code from a compiler or directly from a hand-crafted program, however, the present invention makes the critical observation that it is often the case that register space is wasted. More particularly, as intimated above, a register might not be used to its full capacity in every processing cycle. For instance, when a 16-bit capacity register is used to process 4-bit data elements, 12 bits of the register per cycle are wasted. This slows processing time, creates additional data caching requirements (and attendant cache miss problems), and in general fails to fully exploit processor capacity. Accordingly, the present invention recognizes the potential improvement in processor performance that would inure were multiple data elements to be processed in a register in a single cycle.

The present invention further understands that implementing the above recognition is not trivial, particularly if both positive and negative (that is, "signed") values, and not just positive values, are to be processed, owing to the possibility of exceeding register capacity and/or corrupting data during processing. Stated differently, as used by the present invention a "signed" data element is one that is not constrained to be non-negative, and it is desirable that multiple signed data elements be processed through a single register in a single processing cycle. Furthermore, the present invention understands that for robustness, it is desirable that a processor not be constrained by the manufacturer to accept multiple data elements per register of only predetermined bit sizes, but rather that a programmer have the flexibility to define various data element bit sizes that can be accepted by a register as the particular application might happen to dictate. Having made the above-noted observations, the present invention provides the solutions disclosed herein.

SUMMARY OF THE INVENTION

A general purpose computer is programmed according to the inventive steps herein to enable the use of more than one multi-bit, signed data element in a single register. The invention can also be embodied as an article of manufacture—a machine component—that is used by a digital processing apparatus such as a computer and which tangibly embodies a program of instructions that are executable by the digital processing apparatus to execute the present logic. This invention is realized in a critical machine component that causes a digital processing apparatus to perform the inventive method steps herein.

Accordingly, a general purpose computer includes logic for undertaking method acts to establish at least first and second signed, multi-bit data elements in at least a first register. The logic simultaneously processes the multiple elements.

If desired, the elements can be independent of each other. The first element can be provided from a first data set and the second element can be provided from a second data set, or both elements can be provided from different parts of the same data set. The register itself can pass contents to computational subsystems including but not limited to adders, or multipliers, or shifters, and the operation performed on the data elements simultaneously can be, but is not limited to, a multiplication by a constant or by a variable of known precision, or an addition, or a shift-left logical.

Further, larger data elements can be split among registers and then recombined after processing. That is, the first element can be a first partial element having a related second partial element established in a second register, and the first and second partial elements are combined after processing.

As set forth further below, a respective precision is allocated in a register for each data element to be processed in the register during a single cycle such that the maximum negative number that can be represented by a data element is one larger than the maximum negative number that can be represented in the respective precision. This can include determining a precision bound for a data element based on $[-2^{N-1}+1]$ to $[+2^{N-1}1]$, wherein N is the number of bits in the data element.

Additionally, in a preferred embodiment and prior to execution the logic determines a net number of bits required for any multiplicative constants to achieve a desired precision. Then, using the net number of bits and multiplicative constant, a net number of bits of precision is determined.

Space in the register is allocated in accordance with precision determinations.

Once the registers have been set up by allocating space for multiple signed data elements per register, processing of the data elements is executed by packing multiple data elements into individual registers according to the net number of bits of precision. All data elements in each register are then simultaneously operated on using the same operand. The data elements are then passed on for further processing, storage, or output.

When first and second data elements in a register are to be made independent of each other, the logic adds a sign bit in the first element to the least significant bit in the second element. Alternatively, the method embodied by the logic then includes masking sign bits in the first and second elements, adding the sign bits back in to the register, and discarding the value in the position of the sign bits in each element.

Moreover, it can be determined whether a data element is contained around zero as set forth further below. Also, shift-right arithmetic can be performed by preserving, in a first register, sign bits for a data element packed in a second register, and then zeroing at least one least significant bit to be shifted out of the data element pursuant to undertaking shift-right arithmetic. The sign bits in the first register are restored to the data element in the second register. Still further, arithmetic equality can be confirmed on at least two data elements in a single register during a single processing cycle. In general, arithmetic compares can be undertaken in one cycle per element.

In still another aspect, a computer program device includes a computer program storage device that can be read by a digital processing apparatus. A program is on the program storage device, and the program includes instructions that are executable by the digital processing apparatus for performing method acts for processing multi-bit, signed data elements. The program includes computer readable code means for packing at least first and second data elements into a single register. Computer readable code means process the elements simultaneously.

In yet another aspect, a processor includes at least first and second registers. At least first and second signed, multi-bit data elements are in the first register, with the processor simultaneously operating on the first and second data elements using an operand.

In another aspect, a computer-implemented method includes, for a first program, determining first and second precisions to be allocated in a single register to hold respective first and second signed data elements. The elements are packed into the register and then operated on. For a second program, third and fourth precisions to be allocated in the single register to hold respective third and fourth signed data elements are determined. The first and third precisions and/or the second and fourth precisions can be different from each other. The third and fourth elements are packed into the register and operated on.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic diagram showing the system of the present invention;

FIG. 2 is a schematic diagram showing an alternate system;

FIG. 2A is a schematic diagram showing yet another alternate system;

FIG. 3 is a schematic representation of multiple independent bits in a data register;

FIG. 5 is a flow chart showing the logic for verifying the present rules can be met for a process;

FIG. 7 is a flow chart showing the overall execution logic;

FIGS. 8 and 9 are flow charts showing alternative logic flows for implementing independent elements in a single register;

FIG. 11 is a flow chart showing the logic for shift right arithmetic; and

FIG. 12 is a flow chart showing the logic for arithmetic compares.

DETAILED DESCRIPTION OF THE PREFERRED EMBODIMENTS

Figure 4:
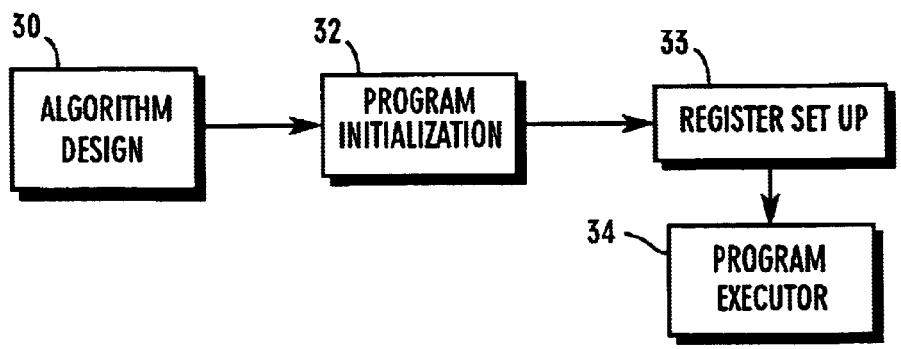
FIG. 4 is a flow chart showing the overall logic of the present invention.

Referring initially to FIGS. 1 and 2, a system is shown, generally designated 10, for enabling the simultaneous processing of multiple signed independent multi-bit data elements per single register of a processor. FIGS. 1 and 2 show various non-limiting ways in which the processing efficiency afforded by the present invention can be exploited. For example, in FIG. 1 a server microprocessor 12 receives a single-source input data stream in, e.g., "postscript" format that represents an image, and the processor processes the data stream "N" times faster than it would without the benefit of the present invention to output, e.g., compressed image data in JPEG format, wherein "N" is further defined below in terms of data elements per register per cycle. The JPEG data is sent to a printer microprocessor 14, which instructs a printer apparatus 16 to print the image. It is to be understood that the present invention applies generally to all types of data, not just to image data, and that it applies to single-processor systems or to multiple processor systems.

FIG. 2, on the other hand, shows that the advantages of the system 10 further can be exploited to cause the server microprocessor to simultaneously process two independent data streams from first and second data sets to output respective first and second output streams to a single printer microprocessor 18 or to respective first and second printer microprocessors 18, 20. In turn, each printer microprocessor 18, 20 can control its own printer apparatus (only apparatus 22 shown in FIG. 2), or a single printer microprocessor can control two printer apparatus. In any case, different images (which are examples of different data streams) or different sections of the same image (data stream) can be processed simultaneously by the system 10, such that the core of the processing code remains unchanged.

FIG. 2A shows that packed image data out 1 & 2 can be sent from a server microprocessor 12A to a printer microprocessor 14A which is programmed to unpack the data for saving bandwidth on the network link between the microprocessors 12A, 14A. In this case, for instance, data out 1 & 2 can be two color components going to respective color engines in respective printer apparatus 16A.

In one intended embodiment, the processor 12 may be a personal computer made by International Business Machines Corporation (IBM) of Armonk, N.Y., or the processor 12 may be any computer, including computers sold under trademarks such as AS400, with accompanying IBM Network Stations. Or, the processor 12 may be a Unix server, or OS/2 server, or Windows NT server, or IBM workstation or an IBM laptop computer. Still further, the present processor which embodies the present registers can be a digital signal processor (DSP), specialized hardware, chips that are built around standard libraries for processing subsystems and arithmetic logic units (ALU). The term "computer register" as used herein refers to registers in all of these data processing units.

With the above overview of the present architecture in mind, it is to be understood that the present logic is executed on the architecture shown in FIG. 1 in accordance with the flow charts discussed below. The flow charts herein illustrate the structure of logic of the present invention as embodied in computer program software and/or programming steps. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the logic may be embodied by a computer program that is executed by the processor 12 as a series of computer-executable instructions. These instructions may reside, for example, in RAM of the processor 12 or on a hard drive or optical drive of the processor 12, or the instructions may be stored on a DASD array, magnetic tape, electronic read-only memory, or other appropriate data storage device.

Now referring to FIG. 3, a register 24 of the processor 12 is schematically shown. In the example, the register 24 is a 16 bit register, and it contains first and second data elements 26, 28. The terms "left" and "right" as used for illustration herein in reference to a register are used in consonance with the order and notation of FIG. 3. Alternate register ordering of the least significant and most significant bits require another convention.

For the illustrative embodiment shown in FIG. 3, the first (right-most) data element 26 contains two guard bits and eight data bits, and thus has an overall "precision" of ten (10), while the second (left) data element 28 has two guard bits and four data bits, and thus has a precision of six (6). In accordance with the present invention, which is directed to twos-complement calculation, the left-most guard bit is a "sign bit" in that it uniquely describes the sign of the element.

It is to be understood that in accordance with present principles, a register 24 can be of any size that is sufficiently large to hold "N" data elements, with the data elements being of the same size or of different sizes. Accordingly, the register of the present invention can be a 32 bit register that holds two 16 bit data elements, or it can hold more than two N-bit elements, or it can be a 64 bit register that holds four 16 bit elements, and so on. In any case, each data element 26, 28 is a multibit element that can be either positive or negative and, hence, is a "signed" element, with the sizes of the elements 26, 28 not being constrained to a single predetermined size during manufacture of the processor 12 but rather being definable by a programmer depending on the particular application. It is to be further understood that the register 24 stores elements and, when appropriate, sends data elements to computational subsystems including but not limited to adders, or multipliers, or shifters.

FIG. 4 shows that four stages of development are contemplated herein. The first, at block 30, is algorithm design, wherein it is determined whether the particular process under consideration can conform to the present invention. The second stage, represented at block 32, is program initialization wherein specifics of implementing the invention in the present registers are determined. Then, register set up is undertaken at block 33. The fourth stage is execution, represented at block 34. All of these stages are discussed further below.

With particular regard to the first stage (algorithm design), reference is now made to FIG. 5. Commencing at block 36, the number of bits required for the required precision as dictated by each original data element is determined. Then, at block 38, for each data element to be operated on, the additional number of bits of precision that might be required for each operation that the elements will undergo is determined. For instance, adding two elements together might result in an output element that is one bit larger than the input elements.

From block 38, the logic moves to decision diamond 40, wherein it is determined whether the precision allocated in block 38 satisfies a maximum negative number rule. By "maximum negative number" is meant the negative number having the largest absolute value. Specifically, at decision diamond 40 it is determined whether the maximum negative number that can be represented by the data element is one larger than the maximum negative number that can be represented in the respective precision, e.g., $-2^{N-1}$ in a twos-complement representation with N bits. If not, an additional bit of precision is allocated for the element at block 42. At block 44, sufficient space is allocated in the register for optimal packing of elements, i.e., it is determined how to most efficiently fill the available registers with the available data elements that are to be simultaneously held in a register with other elements, such that a minimum amount of unused register capacity is achieved. For example, for an 8 bit original data element that is to undergo a maximum of six addition operations, the precision allocated to that element would be (8+6)=14.

Figure 5A:
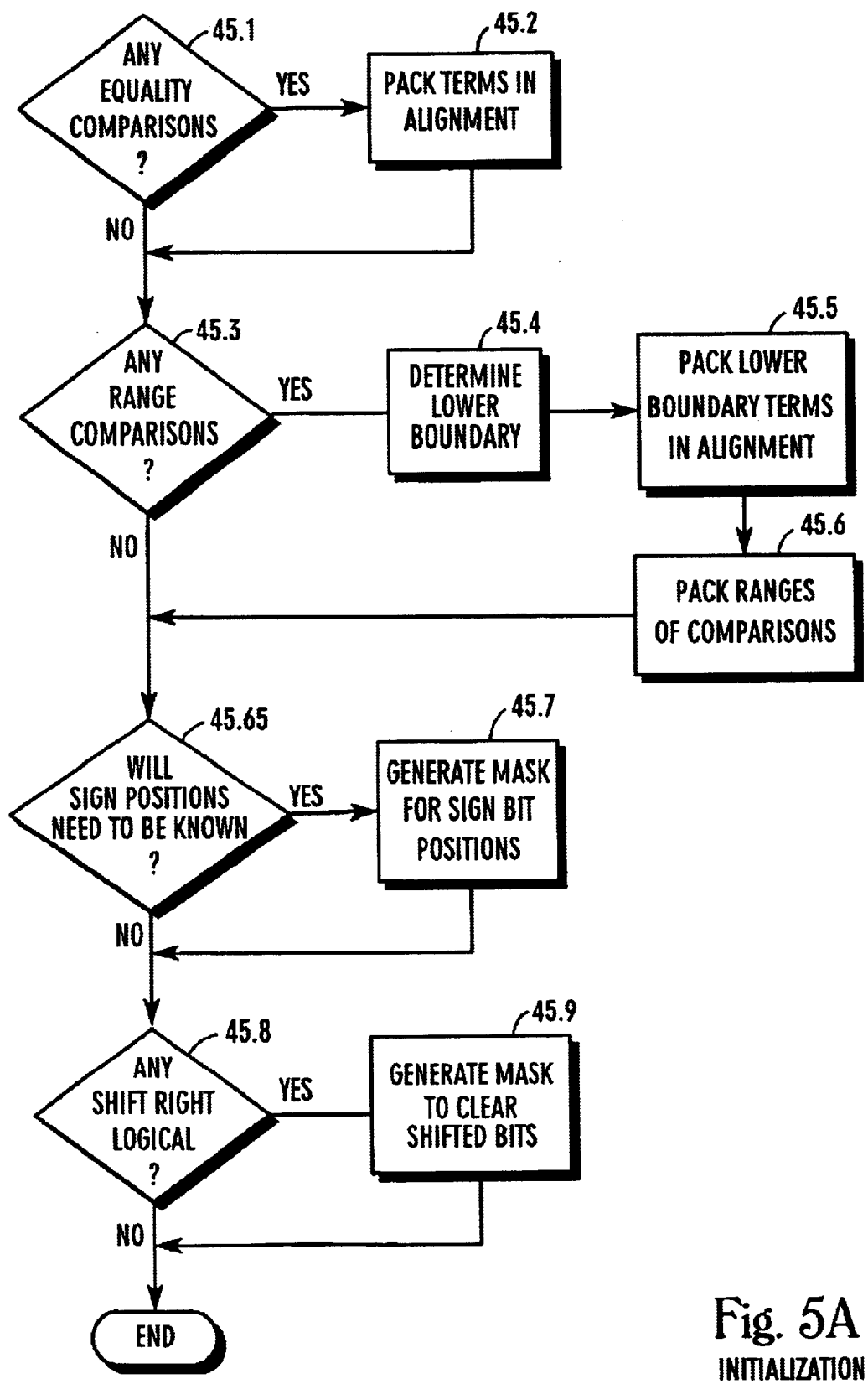
FIG. 5A is a flow chart showing the program initialization logic.

FIG. 5A shows the program initialization logic. At decision diamond 45.1 it is determined whether any equality comparisons will be undertaken. If so, equality comparison terms are packed on element alignments at block 45.2, i.e., the terms to be compared with each other are packed into respective registers in identical register positions. The flow of FIG. 5A also illustrates that at decision diamond 45.3, it is next determined whether any range comparisons will be undertaken, and if so the lower boundary for each such comparison is determined at block 45.4. Then, at block 45.5 the lower boundary terms are packed on element alignments at block 45.5. From block 45.5, the logic moves to block 45.6 to pack the ranges of comparison.

From block 45.6 or from decision diamond 45.3 when the test there is negative, the logic flows to decision diamond 45.65, wherein it is determined whether sign positions of elements will need to be known. If so, a mask is generated at block 45.7 for masking sign bit positions as discussed further below. From block 45.7 or from decision diamond 45.65 when the test there is negative, the logic flows to decision diamond 45.8, wherein it is determined whether any shift right logical operations will be performed. If so, a mask is generated at block 45.9 for clearing shifted bit positions as discussed further below.

Figure 6:
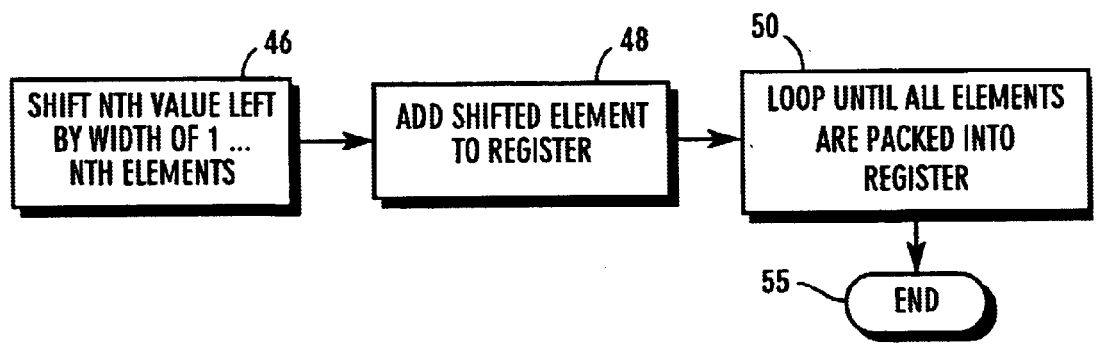
FIG. 6 is a flow chart showing the register set up logic.

FIG. 6 shows the register set up logic. Commencing at block 46, for a register having "m"values, the $m^{th}$ value is shifted left (again in terms of the directions illustrated in FIG. 3) by a width of the values to its right, i.e., by a width of 1, . . . ,(m−1) values. At block 48, the element containing the value shifted at block 46 is added to the designated register. Block 50 indicates that the process of blocks 46 and 48 is looped through until all elements that are to be packed in the register are added to the register. The logic ends at state 55. It is to be understood that original elements can be split into sub-elements that are processed in different registers as elements in and of themselves, and then recombined after processing. For example, if two complete data elements plus two sets of extra precision that might be required by the particular process do not fit into one register, then one complete element plus a partial element with two sets of extra precision can be processed through one register while the remainder sub-element can be processed through another register.

When the above conditions are met for all data elements that are to be processed in accordance with the present invention, a carry propagating left (in terms of the exemplary register 24 shown in FIG. 3) without a previous borrow having occurred can never happen. This is desirable, because a carry propagating left without a previous borrow would otherwise indicate an element overflow into the neighboring element. Moreover, satisfying the maximum negative test ensures that a borrow can only follow a borrow in underflow conditions, since it provides for the borrow required for the sign reversal from the element to the immediate right of the affected element. It follows that in any one processing cycle, at most one borrow has occurred from each element in the register, and the borrow is signified by the presence of a "1" bit in the adjacent (to the right) element'ssign bit (the sign bit is an element'most significant bit).

Once the register set up process is complete, the input data stream can be processed by executing the logic shown in FIG. 7. At block 56 the data elements are packed into the processor 12 registers according to the space allocations discussed above. Specifically, multiple multi-bit, signed data elements are packed into at least one register of the processor 12 at block 56. Then, in each processing cycle in each register holding multiple data elements, the data elements are simultaneously processed by identical operations, i.e., by the operation embodied by the program. One-cycle operations include addition/subtraction of two registers, addition/subtraction of immediate values, shift-left logical, positive or negative multiplication by a single value or by a variable of known precision, equality operations, AND operations with the sign bits, and OR operations of the sign bits. Also, arithmetic comparisons for the element in the highest order (left-most) bits of the register can be performed against predetermined numbers in a single cycle, with such comparisons for lower-order elements in a register requiring an extra cycle to copy them and shift them to the highest-order bits in another register or the same register if the highest-order bits can be discarded after comparison. Shift-right arithmetic, shift-right logical, some comparisons, and negation all require extra cycles, but can be accomplished for all elements in the multiple cycles. For elements in separate registers that are to be compared to each other, added to each other, or subtracted from each other, the corresponding elements must be aligned, i.e., a first element in a first register that is to be compared or added to, or subtracted from, a second element in a second register must occupy the same register position in the first register as the second element occupies in the second register.

After the simultaneous operations, the logic flows to decision diamond 59, wherein it is determined whether elements must be split. Specifically, elements in a single register that are simultaneously operated on might need to be independent of each other, and if they are, decision diamond 59 indicates that after simultaneously operating on packed, independent elements in a single register, they are separated from each other in accordance with the logic of FIGS. 8 or 9 discussed below. In general, for independent elements the logic moves to block 62, wherein the processed data elements in a register are split apart and sent to separate registers or to storage. At block 64, any elements that were sub-elements of a large element are recombined with each other. From block 64, or from decision diamond 59 in the case wherein the packed elements in a register need not be independent of each other, the elements are sent on for storage, output, or further processing at block 66.

FIGS. 8–12 illustrate various preferred details of the present invention. Referring to FIG. 8, a first logic flow for making elements in a register independent of each other can be seen. Commencing at block 68, after operating on the elements at block 58 in FIG. 7, the sign bit of the right-most element (again in terms of the exemplary register 24 shown in FIG. 3) is added to the least significant bit of the immediately adjacent element to the left. Block 70 indicates that when more than two elements are contained in a register, the step at block 68 is undertaken recursively, effectively removing all borrows between elements.

Alternatively, the logic of FIG. 9 can be invoked to make elements independent. Commencing at block 72 in FIG. 9, when elements in a register must be made completely independent of each other after processing and the bit following the sign bit of an element is identical to the sign bit (meaning the sign bit can be sacrificed), a mask selecting all of the sign bits in a register is applied to a copy of the register and added back into the register at block 74. This clears all sign bits until a carry or borrow arrives, with the cleared sign bit position of an element capturing carries and borrows from its right-adjacent neighbor. By "mask sign bits" is meant performing a bitwise AND of the register with a pattern that has "1" in the sign bit position and "0" elsewhere. Masking and discarding of the leftmost element'ssign bit can be undertaken or not, since the leftmost element has no other elements to its left with which to interact.

Then, the value in the left most (or previous sign bit) position of each element is discarded or ignored at block 76 before passing the element on. Although the above operation results in decreasing the precision per data element, it renders the elements independent of each other in fewer cycles than the recursive method shown in FIG. 8, with the corrupted data in the sign bit positions being discarded. The discarding can be undertaken by an extra left shift as part of left justification in the register for comparison purposes or by a smaller mask to selectively pick off each corrupted bit.

Figure 10:
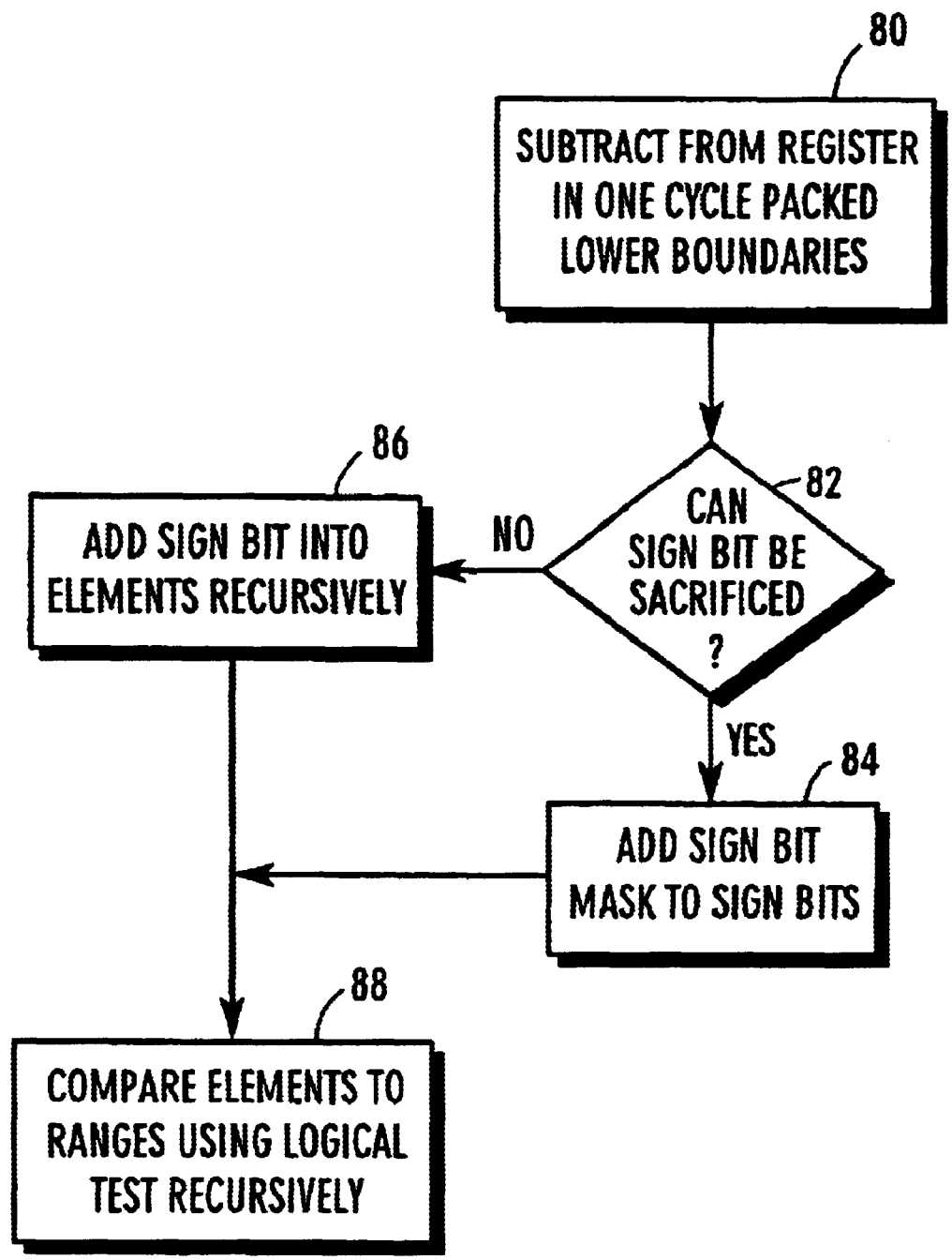
FIG. 10 is a flow chart showing the logic for determining whether an element is contained around zero.

Now referring to FIG. 10, the logic for determining whether a data element is contained around zero (for, e.g., JPEG quantization to zero) can be seen. At block 80 the packed lower boundaries of the range are subtracted from the register in one cycle. Moving to decision diamond 82, it is determined whether the sign bit of the element under test (i.e., undergoing the comparison) can be sacrificed in accordance with principles discussed above. If so, the above-mentioned sign bit mask is added to mask the sign bits at block 84. Then, at block 88 the element under test is compared to the respective range in a single logical test. Since an extra unused bit of precision has been provided for the data elements, the sign bit remains present in the second-from-the-left position in each element. The process at block 88 from block 84 is looped on until all elements are compared.

In contrast, when the test at decision diamond 82 is negative, the sign bit is added into the neighboring element at block 86. Then, at block 88 the element under test is compared to the top boundary in a single logical test and the process at blocks 86 and 88 is looped on until all elements are compared.

In relation to the discussion of FIG. 10, after the comparison at block 88, the elements should be masked to zero or shifted left one at a time, so that the comparison is always done for the left-most nonmasked element in the register against the boundary.

FIG. 11 shows the logic for shift-right arithmetic. Commencing at block 92, the sign bits of each element are preserved in a separate register. Moving to block 94, the elements are made independent as disclosed above using FIGS. 8 and 9, and then at block 96 shift right arithmetic is undertaken by one position. Next, at block 97 the sign bit positions for the elements in a register are cleared in one cycle. At block 98, the sign bit for each element is OR'ed back into the register, with the steps at blocks 96 and 98 being repeated as indicated at block 99 until the shift is completed. If more operations are to be performed as determined at decision diamond 99, the packed format can be restored by subtracting the new sign bits one at a time from right to left, letting them ripple through the register. This is done, as indicated in FIG. 11, by adding the sign bits to themselves at block 99.2 and then OR'ing the sign bits back into the elements at block 99.3.

As stated above, an extra bit of precision is allocated beyond the maximum negative number. FIG. 12 shows how to exploit this extra bit of precision to undertake arithmetic equality confirmation. Commencing at block 100, the present invention defines a value for a 4-bit element of xxxx0 to be the correct value, and a value of xxxx1 to indicate that the right-adjacent value'ssign bit has been borrowed from the value. At block 102, the value is then compared with the extra bit of precision.

While the particular SYSTEMS AND METHODS FOR ENABLING MULTIPLE SIGNED INDEPENDENT DATA ELEMENTS PER REGISTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

No claim element herein is to be construed under the provisions of 35 U.S.C. §112, sixth paragraph, unless the element is expressly recited using the phrase "means for".

We claim:

1. A computer system, comprising:
 a processor, the processor using logic for undertaking method acts to enable the simultaneous processing of multiple multi-bit data elements in a single register, the method acts undertaken by the logic including:
  establishing at least first and second signed, multi-bit data elements in at least a first register;
  simultaneously processing the elements, wherein the first element is provided from a first data set and the second element is provided from a second data set different than the first;
  allocating a respective precision in a register for each data element to be processed in the register during a single cycle such that a maximum negative number that can be represented by a data element is one larger than the maximum negative number that can be represented in the respective precision.

2. The processor of claim 1, wherein the elements are independent of each other.

3. The processor of claim 1, wherein the register sends plural data elements simultaneously to at least one computational subsystem.

4. The processor of claim 1, wherein the operation is a multiplication by a constant or by a variable of known precision, or an addition, or a shift-left logical, or a subtraction, or a bitwise AND, or a bitwise OR.

5. The processor of claim 1, wherein the first element is a first partial element having a related second partial element established in a second register, and the first and second partial elements are combined after processing.

6. The processor of claim 1, wherein the method acts undertaken by the logic include:
 determining whether a data element is contained around zero.

7. The processor of claim 1, wherein the method acts undertaken by the logic include:
 preserving, in a first register, a sign bit for a data element packed in a second register;
 zeroing at least one least significant bit to be shifted out of the data element pursuant to undertaking shift-right arithmetic;
 performing an arithmetic shift right; and
 restoring sign bits to the data element.

8. The processor of claim 7, wherein the method acts undertaken by the logic include:
 if subsequent operations are to be personnel, subtracting the sign bits to repack the register.

9. The processor of claim 1, wherein the method acts undertaken by the logic include:
 undertaking at least one equality confirmation on at least two data elements in a single register during a single processing cycle.

10. The processor of claim 1, wherein the method acts undertaken by the logic include:
 undertaking at least one arithmetic compare on at least one comparison element in a single register containing at least two elements in a single processing cycle.

11. The processor of claim 10, wherein the arithmetic compare includes using the sign bit of a right-adjacent element to the comparison element.

12. A computer system, comprising:
 a processor, the processor using logic for undertaking method acts to enable the simultaneous processing of multiple multi-bit data elements in a single register, the method acts undertaken by the logic including:
  establishing at least first and second signed, multi-bit data elements in at least a first register;
  simultaneously processing the elements;
  determining a net number of bits required for any multiplicative constants to achieve a desired precision;
  using the net number of bits and multiplicative constant, determining a net number of bits of precision; and
  allocating space in the register in accordance with the using act.

13. The processor of claim 1, wherein the method acts undertaken by the logic include:
  executing a program by:
    packing multiple data elements into at least one single register;
    simultaneously operating on all data elements in the single register; and
    passing the data elements on for further processing, storage, or output after the operating act.

14. The processor of claim 13, wherein the method acts undertaken by the logic include:
  for at least first and second data elements in a single register that are to be independent of each other, adding a sign bit in the first element to a cast significant bit in the second element.

15. A computer system comprising:
  a processor, the processor using logic for undertaking method acts to enable the simultaneous processing of multiple multi-bit data elements in a single register, the method acts undertaken by the logic including:
    establishing at least first and second signed, multi-bit data elements in at least a first register;
    simultaneously processing the elements, wherein the first element is provided from a first data set and the second element is provided from a second data set different than the first;
    splitting, into two or more sub-elements, at least one relatively large data element and packing the sub-elements into separate respective registers; and
    recombining the sub-elements after processing.

16. A computer system, comprising:
  a processor, the processor using logic for undertaking method acts to enable the simultaneous processing of multiple multi-bit data elements in a single register, the method acts undertaken by the logic including:
    establishing at least first and second signed, multi-bit data elements in at least a first register;
    simultaneously processing the elements; and
    determining a precision bound for a data element based on $[-2^{N-1}+1]$ to $[2^{N-1}-1]$, wherein N is the number of bits in the data element.

17. A computer program device comprising:
  a computer program storage device readable by a digital processing apparatus; and
  a program on the program storage device and including instructions executable by the digital processing apparatus for performing method acts for processing multi-bit, signed data elements, the program comprising:
    computer readable code means for packing at least first and second data elements into a single register;
    computer readable code means for processing the elements simultaneously;
    computer readable code means for determining a net number of bits required for any multiplicative constants to achieve a desired precision;
    computer readable code means for using the net number of bits and multiplicative constant to determine a net number of bits of precision; and
    computer readable code means for allocating space in the register in accordance with the using act.

18. The computer program device of claim 17, further comprising:
  computer readable code means for allocating a respective precision in a register for each data element to be processed in the register during a single cycle such that the maximum negative number that can be represented by a data element is one larger than the maximum negative number that can be represented in the respective precision.

19. The computer program device of claim 17, further comprising:
  computer readable code means for executing a program by:
    packing multiple data elements into at least one single register according to the net number of bits of precision;
    simultaneously operating on all data elements in the single register; and
    passing the data elements on for further processing, storage, or output after the operating act.

20. The computer program device of claim 19, further comprising:
  computer readable code means for, for at least first and second data elements in a single register that are to be independent of each other, adding a sign bit in the first element to a least significant bit in the second element.

21. The computer program device of claim 19, further comprising:
  computer readable code means for splitting, into two or more sub-elements, at least one relatively large data element and packing the sub-elements into separate respective registers;
  computer readable code means for recombining the sub-elements after processing.

22. The computer program device of claim 21, further comprising:
  computer readable code means for determining whether a data element is contained around zero.

23. The computer program device of claim 22, further comprising:
  computer readable code means for preserving, in a first register, a sign bit for a data element packed in a second register;
  computer readable code means for zeroing at least one least significant bit to be shifted out of the data element pursuant to undertaking shift-right arithmetic;
  computer readable code means for performing an arithmetic shift right; and
  computer readable code means for restoring the sign bits and guard bits to the data element.

24. The computer program device of claim 23, further comprising:
  computer readable code means for undertaking at least one equality confirmation on at least two data elements in a single register during a single processing cycle.

25. A method, comprising:
  determining first and second precisions to be allocated in a single register to hold respective first and second signed data elements;
  packing the elements into the register;

operating on the elements;
determining third and fourth precisions to be allocated in the single register to hold respective third and fourth signed data elements, at least one of: the first and third precision being different from each other, and the second and fourth precisions being different from each other;
packing the third and fourth elements into the register; and
operating on the third and fourth elements.

26. The method of claim 25, wherein the register sends plural data elements simultaneously to at least one computational subsystem.

27. The method of claim 25, wherein the operation is a multiplication by a constant or by a variable of known precision, or an addition, or a shift-left logical, or a subtraction, or a bitwise AND, or a bitwise OR.

28. The method of claim 25, wherein the elements are independent of each other.

29. The method of claim 25, wherein the first element is provided from a first data set and the second element is provided from a second data set different than the first.

30. The method of claim 25, wherein the first element is a first partial element having a related second partial element established in a second register, and the first and second partial elements are combined after processing.

31. The method of claim 25, wherein the first element is provided from a first data set and the second element is provided from the first data set.

32. The method of claim 25, wherein the step of determining first and second precisions includes determining the precisions such that the maximum negative number that can be represented in an element is one larger than the maximum negative number that can be represented in the respective precision.

33. The method of claim 25, wherein the elements are processed such that in a single processing cycle a carry propagating left can only occur in the event of a previous borrow.

34. The method of claim 25, wherein at most one borrow per element can occur in a single processing cycle.

35. The method of claim 25, further comprising:
allocating a respective precision in a register for each data element to be processed in the register during a single cycle such that the maximum negative number that can be represented by a data element is one larger than the maximum negative number that can be represented in the respective precision.

36. The method of claim 35, further comprising:
determining a net number of bits required for any multiplicative constants to achieve a desired precision;
using the net number of bits and multiplicative constant, determining a net number of bits of precision; and
allocating space in the register in accordance with the using act.

37. The method of claim 36, further comprising:
executing a program by:
packing multiple data elements into at least one single register according to the net number of bits of precision;
simultaneously operating on all data elements in the single register; and
passing the data elements on for further processing, storage, or output after the operating act.

38. The method of claim 37, further comprising:
for at least first and second data elements in a single register that are to be independent of each other, adding a sign bit in the first element to a least significant bit in the second element.

39. The method of claim 37, further comprising:
splitting, into two or more sub-elements, at least one relatively large data element and packing the sub-elements into separate respective registers; and recombining the sub-elements after processing.

40. The method of claim 35, further comprising determining a precision bound for a data element based on $[-2^{N-1}+1]$ to $[2^{N-1}-1]$, wherein N is the number of bits in the data element.

41. The method of claim 25, further comprising:
determining whether a data element is contained around zero.

42. The method of claim 25, further comprising:
preserving, in a first register, sign bits for a data element packed in a second register;
zeroing at least one least significant bit to be shifted out of the data element pursuant to undertaking shift-right arithmetic; and
restoring the sign bits to the data element.

43. The method of claim 25, further comprising:
undertaking at least one equality confirmation on at least two data elements in a single register during a single processing cycle.

44. A computer system, comprising:
a processor, the processor using logic for undertaking method acts to enable the simultaneous processing of multiple multi-bit data elements in a single register, the method acts undertaken by the logic including:
establishing at least first and second signed, multi-bit data elements in at least a first register;
simultaneously processing the elements;
for at least first and second data elements in a single register, masking sign bits in the first and second elements;
adding the sign bits back in to the register; and
discarding a value in a position of the sign bits in each element.

45. A computer program device comprising:
a computer program storage device readable by a digital processing apparatus; and
a program on the program storage device and including instructions executable by the digital processing apparatus for performing method acts for processing multi-bit, signed data elements, the program comprising:
computer readable code means for packing at least first and second data elements into a single register;
computer readable code means for processing the elements simultaneously;
computer readable code means for, for at least first and second data elements in a single register that are to be independent of each other, masking sign bits in the first and second elements;
computer readable code means for adding the sign bits back in to the register; and
computer readable code means for discarding a position of the sign bits in each element, with the possible exception of the sign bit for a left-most element in the register.

46. A method, comprising:
determining first and second precisions to be allocated in a single register to hold respective first and second signed data elements;
packing the elements into the register;

operating on the elements;

determining third and fourth precisions to be allocated in the single register to bold respective third and fourth signed data elements, at least one of: the first and third precision being different from each other, and the second and fourth precisions being different from each other;

packing the third and fourth elements into the register;

operating on the third and fourth elements;

for at least first and second data elements in a single register that are to be independent of each other masking sign bits in the first and second elements;

adding the sign bits back in to the register; and discarding a position of the sign bits in each element.

* * * * *